Patented Jan. 23, 1940

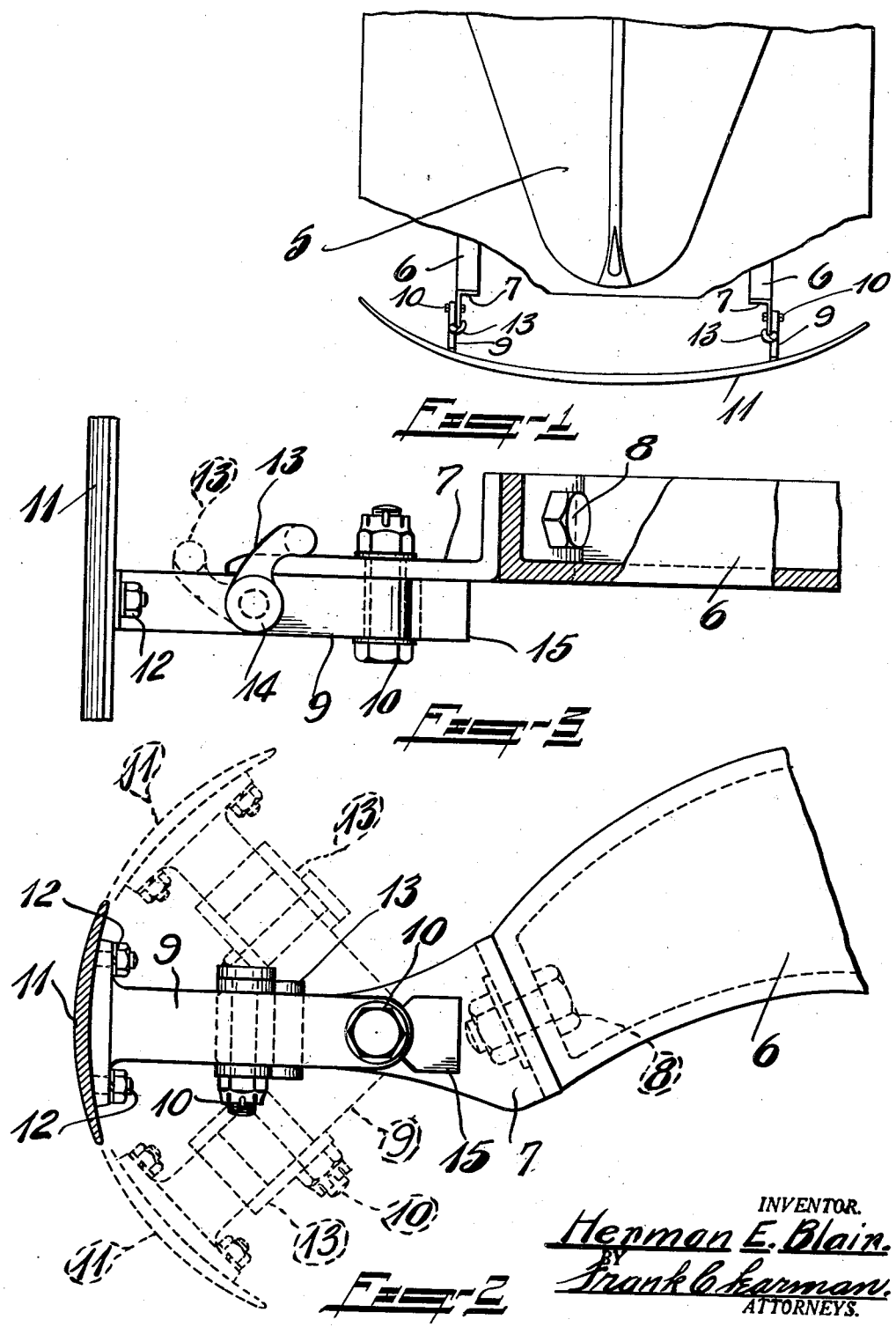

2,188,142

UNITED STATES PATENT OFFICE 2,188,142

AUTOMOBILE BUMPER MOUNTING

Herman E. Blair, Grand Rapids, Mich.

Application February 1, 1939, Serial No. 253,959

4 Claims. (Cl. 293—55)

This invention relates to bumpers, and more particularly to bumpers such as used on the front and rear of automotive vehicles in general to protect fenders, frame and other parts in the event of shocks or jars of impact or collision with another vehicle or obstacle.

One of the prime objects of the invention is to design new and novel means for attaching the bumper to the vehicle, so that it can be easily and quickly swung up or down as occasion demands for release or disengagement with an obstacle or the bumper of another car with which it may become locked when parking, or when pushing another car or by reason of collision.

Another object is to provide very simple, practical and substantial, quickly operable means for releasing the bumper to permit it to be swung up or down and again locking it in position, which means is readily accessible for manipulating when necessary.

A further object is to provide a bumper mounting composed of few parts, which can be readily manufactured and assembled, and which can be easily mounted in position.

With the above and other objects in view the present invention consists in the combination and arrangement of parts, hereinafter more fully described, illustrated in the accompanying drawing, and more particularly pointed out in the appended claims, it being understood that changes may be made in the form, size, proportions, and minor details of construction, without departing from the spirit, or sacrificing any of the advantages of the invention.

In the drawing:

Fig. 1 is a fragmentary top plan view of an automotive vehicle showing my new bumper mounting.

Fig. 2 is an enlarged side elevational view showing the bumper attached to a vehicle frame, the broken lines illustrating the range of movement of the bumper bar.

Fig. 3 is a top plan view of the parts shown in Fig. 2.

In many cities the local ordinances require that automobiles be parked parallel one behind the other, and this parallel parking ofttimes requires that an automobile be parked in limited space between two other automobiles, and as the bumpers project on all cars, they very frequently become hooked one over or under the other, and it is then necessary to disengage them by either jacking up the end of one car or by using sufficient force to spring one bumper downwardly while exerting a lifting force on the other bumper until the bumpers clear.

This requires considerable exertion and labor, and is dangerous to the persons so engaged, as fingers, hands and legs are ofttimes wedged and seriously injured, and I have therefore, perfected a very simple, practical and substantial bumper mounting which can be readily unlatched, so that the bumper bar can be swung either up or down, and so that it can be easily disconnected from an obstacle or another bumper.

Referring now to the drawing in which I have shown the preferred embodiment of my invention, the numeral 5 indicates a conventional automotive vehicle which includes the spaced apart frame members 6, preferably channel shaped in cross section, and to which the angular shaped extension brackets 7 are secured by means of bolts 8 as usual.

Outwardly extending supporting arms 9 are pivotally secured to the brackets 7 at a point intermediate their length by means of bolts 10, and the bumper bar 11 is rigidly secured to the outer ends of said arms by means of bolts 12, so that the bumper bar, when unlocked, can swing about the pivot bolts 10, and as clearly shown in Fig. 2 of the drawing.

A substantially yoke shaped latch member 13 is mounted on each arm 9 by means of the bolt 14, and is designed to be swung inwardly over the outer end of the member 7 to secure the arms 9 in horizontal, parallel relation therewith, and as shown clearly in solid lines in Fig. 2 of the drawing.

A lug 15 is cast integral with and on the side of the bracket 7, the front face of said lug being turned to receive the turned end of the arm 9, so that heavy shocks and impacts caused by the vehicle striking other cars or obstacles will not be taken entirely by the bolt 10, but will in turn be transmitted to the lug 15.

In practice the bumper is in position as shown in solid lines in Fig. 2 of the drawing, then if it becomes hooked or locked with the bumper of another vehicle, the driver merely swings the latch yoke 13 to position as shown in broken lines in Fig. 3 of the drawing, and the bumper bar can be swung down or up, as may be necessary, and as indicated in broken lines in Fig. 2 to release the bar from the other bumper, the vehicle is then moved rearwardly to permit the bumper structure to again be swung to horizontal position, and the latch yoke is then swung to solid line position to securely hold the bumper in normal parallel relation.

While in the present instance, I have shown a specific bumper design and construction, it will be understood that this is for explanatory purposes only, and that any desired design and/or construction can be utilized.

From the foregoing description, it will be clearly obvious that I have perfected a very simple, practical, and convenient bumper mounting which permits the bumper bar to be swung either up or down, and which can be readily locked in normal horizontal position.

What I claim is:

1. The combination with the frame of a vehicle, of a bumper for said vehicle, including rearwardly extending attaching arms, pivotally connected to the frame at a point spaced from the outer end of said frame and freely swingable up and down to out of the way position, and a yoke-shaped latching means pivotally mounted on each arm and adapted to be swung over the end of the frame for releasably securing the arms in rigid parallel relation with said frame.

2. The combination with the frame of a vehicle, of a bumper for said vehicle, and including rearwardly extending arms, brackets secured to and extending forwardly from the ends of the frame, and to which said arms are pivotally connected at a point intermediate their length, and a manually operable yoke-shaped latching means pivotally mounted on each arm and adapted to releasably engage the outer end section of each frame bracket for holding said bumper in horizontal position.

3. The combination with the frame of a vehicle, of a bumper for said vehicle, comprising a bumper bar provided with rearwardly extending arms, forwardly projecting brackets rigidly secured to the ends of the vehicle frame and having a lug cast integral therewith and on the side wall thereof, said bumper bar arms being pivotally connected to said brackets at a point spaced rearwardly from the front ends thereof, with the ends of the arms butting against said bracket lugs, and locking means on said arms, and releasably engaging the end sections of the brackets for rigidly securing the bumper in horizontal position.

4. The combination with the frame of a motor vehicle, of a bumper for said frame, forwardly projecting brackets on the ends of the frame and having lugs on the side walls thereof, bumper arms pivotally mounted on said brackets at a point spaced rearwardly from the front end of each bracket with the ends of the arms butting against said lugs, and latching yokes pivotally mounted on said arms and adapted in one position to engage the end sections of the brackets to hold the arms in horizontal position, and in another position to permit the arms to swing up and down to out of the way position as desired.

HERMAN E. BLAIR.